US012517147B2

(12) United States Patent
Hecht et al.

(10) Patent No.: US 12,517,147 B2
(45) Date of Patent: Jan. 6, 2026

(54) SYSTEM AND METHOD FOR AUTOMATIC CLOSURE OF SAMPLE VESSELS

(71) Applicant: ABBOTT AUTOMATION SOLUTIONS GMBH, Hamburg (DE)

(72) Inventors: Robert Hecht, Seehausen (DE); Evgeny Gerber, Hamburg (DE)

(73) Assignee: ABBOTT AUTOMATION SOLUTIONS GMBH, Hamburg (DE)

( * ) Notice: Subject to any disclaimer, the term of this patent is extended or adjusted under 35 U.S.C. 154(b) by 0 days.

(21) Appl. No.: 18/638,355

(22) Filed: Apr. 17, 2024

(65) Prior Publication Data

US 2024/0280601 A1 Aug. 22, 2024

Related U.S. Application Data

(63) Continuation of application No. 18/393,022, filed on Dec. 21, 2023, now Pat. No. 12,270,818, which is a (Continued)

(30) Foreign Application Priority Data

Nov. 25, 2016 (EP) .................................... 16200627

(51) Int. Cl.
*B65B 7/28* (2006.01)
*B01L 3/00* (2006.01)
(Continued)

(52) U.S. Cl.
CPC .......... *G01N 35/04* (2013.01); *B01L 3/50825* (2013.01); *B65D 39/04* (2013.01);
(Continued)

(58) Field of Classification Search
CPC . B01L 3/50825; B65B 7/2821; B65B 7/2842; B65D 69/00
See application file for complete search history.

(56) References Cited

U.S. PATENT DOCUMENTS 1,755,493 A * 4/1930 Stohr ..................... B65D 39/04 215/292
1,788,348 A * 1/1931 Lemme ................... A47F 1/065 312/43
(Continued)

FOREIGN PATENT DOCUMENTS

CN 201432271 Y 3/2010
DE 19911349 A1 9/2000
(Continued)

OTHER PUBLICATIONS

United States Patent and Trademark Office, "Non-Final Office Action," issued in connection with U.S. Appl. No. 18/393,022, dated Dec. 19, 2024, 8 pages.
(Continued)

*Primary Examiner* — Gloria R Weeks
(74) *Attorney, Agent, or Firm* — Hanley, Flight & Zimmerman, LLC

(57) ABSTRACT

A system and method for automatic closure of sample vessels such as vessels with medical laboratory samples, having a plurality of identically shaped, stackable closure caps with a convex outer face and concave inner face that are stacked in a closure cap stack such that an upper closure cap in the stack bears with its convex outer face on the concave inner face of a lower closure cap lying immediately below in the stack. The system includes a closure gripper for gripping an uppermost closure cap from the stack, for transferring the gripped closure cap to the sample vessel to be closed, and for introducing the gripped closure cap into an opening of the sample vessel in order to tightly close the opening. The closure gripper has a centering piece insertable into a closure cap such that it bears on the concave inner face of the closure cap.

16 Claims, 7 Drawing Sheets

Related U.S. Application Data continuation of application No. 17/724,817, filed on Apr. 20, 2022, now Pat. No. 11,860,178, which is a continuation of application No. 16/349,746, filed as application No. PCT/EP2017/077324 on Oct. 25, 2017, now Pat. No. 11,320,445.

(51) Int. Cl.
*B65D 39/04* (2006.01)
*B67B 1/04* (2006.01)
*G01N 35/04* (2006.01)

(52) U.S. Cl.
CPC ........... *B67B 1/04* (2013.01); *B01L 2200/023* (2013.01); *B01L 2200/0689* (2013.01); *G01N 2035/0405* (2013.01); *G01N 2035/0406* (2013.01)

(56) References Cited

U.S. PATENT DOCUMENTS 1,989,039 A * 1/1935 Geyer ................... B65B 7/2842 198/346.2
2,059,546 A * 11/1936 Brandenburg .......... B65B 43/44 221/262
3,282,025 A * 11/1966 Amberg ................ B65B 7/2807 53/367
3,293,823 A * 12/1966 Anderson ............. B65B 7/2842 53/307
3,340,591 A * 9/1967 Fisher ....................... B65C 3/18 53/410
3,415,034 A * 12/1968 Schmitt ................... B67B 3/062 206/520
3,628,307 A * 12/1971 Croasdale ............. B65B 7/2807 53/299
3,712,023 A * 1/1973 Bryan, Jr. ............. B65B 7/2807 53/307
3,861,563 A * 1/1975 Lisbin ....................... A47F 1/06 221/279
3,905,178 A * 9/1975 West ....................... B65B 43/44 53/328
3,985,265 A * 10/1976 Sauer ................... B65G 59/106 221/221
4,168,599 A * 9/1979 King ..................... B65B 7/2807 53/529
4,276,734 A * 7/1981 de Fasselle ............... B65B 3/36 53/367
4,307,557 A * 12/1981 Shimizu ................ B65B 7/2842 53/248
4,357,787 A * 11/1982 Long ..................... B67B 3/2033 53/317
4,391,560 A 7/1983 Fardin
4,395,864 A 8/1983 Anderson et al.
4,817,363 A * 4/1989 St. Clair ............. B29C 66/8221 53/307
4,903,458 A 2/1990 Hakansson
4,919,587 A * 4/1990 Tashiro ................ B65G 59/103 414/796.1
4,967,930 A * 11/1990 Koltze ................. B65G 59/103 221/210
4,987,721 A * 1/1991 Turtschan ............... B65B 55/10 198/665
5,113,636 A 5/1992 Mihara et al.
5,157,895 A * 10/1992 Shibauchi ........... B29C 66/8161 53/367
5,175,980 A 1/1993 Chiappe et al.
5,438,814 A * 8/1995 Lovett ................... B65B 7/2807 53/367
5,617,705 A * 4/1997 Sanfilippo ............. B65B 31/028 53/489
5,671,705 A 9/1997 Matsumoto et al.
5,688,008 A * 11/1997 Hansch ................ B65H 3/0883 271/103
5,746,042 A * 5/1998 Lombardi ............. B65B 7/2807 53/308
6,357,624 B1 * 3/2002 Brown .................... A47F 1/065 221/280
6,623,236 B1 * 9/2003 Barnes ................ B65G 59/106 294/188
6,796,108 B2 * 9/2004 Jorba Ribes ............ B65B 3/006 53/282
6,960,324 B1 11/2005 Hoffmann
8,834,814 B2 * 9/2014 Yamagata ............. G01N 35/04 422/509
9,271,582 B1 * 3/2016 Pando ..................... A47F 1/106
9,815,579 B2 11/2017 Larsson et al.
10,494,201 B2 * 12/2019 Keijzer ................ B65G 59/103
10,507,941 B2 * 12/2019 Seversky ................ B65B 67/02
10,529,165 B2 * 1/2020 Marquis .................. G07F 11/24
10,815,018 B2 * 10/2020 Larroche .................. A23B 2/30
11,320,445 B2 * 5/2022 Hecht ....................... B67B 1/04
11,427,361 B2 8/2022 Demmeler et al.
11,459,192 B2 * 10/2022 Kirihara ................ B65B 7/2807
11,884,197 B2 1/2024 Carter
2004/0031798 A1 * 2/2004 Fox ....................... B29C 66/545 206/508
2005/0092767 A1 * 5/2005 Schroeder ............... A47F 1/085 221/208
2006/0162285 A1 * 7/2006 Haynes ................... B67B 3/261 53/317
2012/0321516 A1 * 12/2012 Schacher ............... G01N 35/04 53/381.1
2014/0174028 A1 * 6/2014 Yamagata ............. G01N 35/00 53/287
2014/0331618 A1 * 11/2014 Guggisberg .............. B65B 7/28 53/287
2015/0121815 A1 * 5/2015 Larsson .................. B65B 61/20 53/471
2016/0001003 A1 * 1/2016 Perazzo ............. A61M 5/1782 53/493
2016/0083235 A1 * 3/2016 Habura ..................... B67B 7/18 53/381.4
2016/0272348 A1 * 9/2016 Itoh ....................... B65B 7/2835
2018/0057194 A1 * 3/2018 Burken ................. B65B 7/2807
2018/0134424 A1 5/2018 Seversky et al.
2020/0140129 A1 5/2020 Demmeler et al.
2021/0139258 A1 5/2021 Kirihara et al.

FOREIGN PATENT DOCUMENTS

EP 2801828 A1 11/2014
EP 3070480 A1 9/2016

OTHER PUBLICATIONS

United States Patent and Trademark Office, "Notice of Allowance and Fee(s) Due," issued in connection with U.S. Appl. No. 18/393,022, dated Feb. 12, 2025, 5 pages.
European Patent Office, "Search Report," issued in connection with European Patent Application No. 16200627, issued on Jun. 13, 2017, 4 pages.
European Patent Office, "Search Opinion," issued in connection with European Patent Application No. 16200627, issued on Jun. 13, 2017, 6 pages.
International Searching Authority, "International Search Report," issued in connection with PCT No. PCT/EP2017/077324, Nov. 3, 2017, 6 pages.
International Searching Authority, "Written Opinion," issued in connection with PCT No. PCT/EP2017/077324, May 31, 2018, 8 pages.
European Patent Office, "Communication under 71(3)," issued in connection with European Patent Application No. 16200627, issued on Nov. 30, 2018, 10 pages.
United States Patent and Trademark Office, "Non-Final Office Action," issued in connection with U.S. Appl. No. 16/349,746, dated Mar. 4, 2021, 11 pages.
United States Patent and Trademark Office, "Non-Final Office Action," issued in connection with U.S. Appl. No. 16/349,746, dated Sep. 10, 2021, 9 pages.

(56) References Cited

OTHER PUBLICATIONS

United States Patent and Trademark Office, "Notice of Allowance," issued in connection with U.S. Appl. No. 16/349,746, dated Jan. 24, 2022, 5 pages.

United States Patent and Trademark Office, "Non-Final Office Action," issued in connection with U.S. Appl. No. 17/724,817, dated Mar. 24, 2023, 11 pages.

United States Patent and Trademark Office, "Notice of Allowance," issued in connection with U.S. Appl. No. 17/724,817, dated Aug. 18, 2023, 8 pages.

* cited by examiner

SYSTEM AND METHOD FOR AUTOMATIC CLOSURE OF SAMPLE VESSELS

CROSS-REFERENCE TO RELATED APPLICATIONS

This patent arises from a Continuation of U.S. application Ser. No. 18/393,022, titled "System and Method for Automatic Closure of Sample Vessels," filed Dec. 21, 2023, which is a Continuation of U.S. application Ser. No. 17/724,817 (now U.S. Pat. No. 11,860,178), titled "System and Method for Automatic Closure of Sample Vessels," filed Apr. 20, 2022, which is a Continuation of U.S. application Ser. No. 16/349,746 (now U.S. Pat. No. 11,320,445), titled "System and Method for Automatic Closure of Sample Vessels," filed May 14, 2019, which is a National Stage Entry of PCT/EP2017/077324 with an International Filing Date of Oct. 25, 2017, which application claims priority from European Patent Application No. EP16200627.4, filed Nov. 25, 2016. The entire disclosures of these aforementioned applications are incorporated herein by reference.

TECHNICAL FIELD

The invention relates, on the one hand, to a system and, on the other hand, also to a method for automatically closing sample vessels, in particular sample vessels having medical laboratory samples.

BACKGROUND

Background Information

In laboratory analysis technology, it is typical for laboratory samples obtained in a decentralized manner to be transferred in sample vessels provided especially for this purpose to a central analytic laboratory. So as not to contaminate the samples or lose them due to spilling, after the samples are taken and decanted into the sample vessels, the latter are closed, generally with matching closure caps, which seal the openings of the sample vessels. For example, in the field of medical laboratory samples, the sample taking, for example, taking blood samples, typically takes place in medical practices or hospitals. These medical samples are typically decanted in this case into tubular sample vessels made of plastic, more rarely still made of glass, the sample vessels are closed, and then transferred to a medical analytic laboratory.

In the analytic laboratory, the corresponding samples are presently predominantly processed in a completely automated manner. Depending on which parameters are to be determined with respect to the laboratory sample, one or more measurements are carried out using one or also multiple automated measuring devices. The transportation of the laboratory samples to and between the measuring devices presently also predominantly takes place fully automatically. In order that the samples contained in the initially closed sample vessels can be analyzed and examined, firstly the closure, the cover or the cap, is to be removed from the respective sample vessel. An automated process is frequently also used for this opening of the sample vessels, also referred to in laboratory jargon as "de-capping". A device can be used for this purpose, for example, as described in DE 199 11 349 A1.

After the samples have passed through all specified assays in the analytic laboratory, they generally still have to be stored for a specified period of time to be stored for possible later examinations, for example, for verifying a determined value or also for determining further analysis values requested later by the client. Such a storage of the samples typically takes place in this case in the original sample vessels, which are stored in a sample archive. If the laboratory samples are sensitive or perishable samples, such a sample archive can thus be, for example, cooled or monitored in another manner with respect to the storage conditions.

In order that the samples are not contaminated or impaired in another manner during the storage, the sample vessels are again closed using a closure, a cap, or a cover, to form a seal before the storage in the sample archive, a procedure which is also referred to as "recapping" in the laboratory jargon. This procedure is preferably also carried out automatically, wherein there are different approaches. Sometimes, the closures, using which the sample vessel was originally closed upon arrival in the analysis laboratory, are used for closing the sample vessels. However, such a procedure is logistically complex, since the association of the cover with the sample vessel has to be maintained over the entire process. The automatic handling of sample covers, using which the sample vessels were originally closed, is also comparatively complex. This is because the closures of the sample vessels are of differing nature, and thus these can be screw plugs, press-in plugs or push-in plugs, and other types of closures for this purpose.

A device is described in CN 201432271 Y, using which blood sample vessels can be automatically closed and provided with plugs. In this device, an array of vessels is supplied to a voluminous unit, which supplies plugs for closing the vessels via a conveyor system to the openings and presses the plugs therein. This known device has the problem that it occupies a comparatively large amount of space, in particular the management and handling of the closure caps is bulky, and only sample vessels of uniform dimensioning can be closed using this device. However, in the everyday activity of an analysis laboratory, generally greatly differing sample vessels are handled, for example, tubular sample vessels in a medical analytic laboratory, which in particular have different removal openings to be reclosed, in particular those having different diameters. The handling of a reclosure of such varied sample vessels is not automatically possible using the previously known system.

SUMMARY

It is accordingly the object of the invention to specify here a system for automatically closing sample vessels, in particular sample vessels having medical laboratory samples, and also a method for this purpose, using which an automated closure of sample vessels, preferably of differing constructions, is possible in a space-saving manner, in particular a secure closure for a subsequent archiving of the samples.

This object is achieved with respect to a system by such a system for automatically closing sample vessels, in particular sample vessels having medical laboratory samples, comprising i. a plurality of identically formed, stackable closure caps, which have a convex outer side and a concave inner side and are stacked in at least one closure cap stack in such a way that an upper closure cap in the closure cap stack bears with its convex outer side on the concave inner side of a lower closure cap located directly underneath in the closure cap stack, ii. a closure gripper for grasping an uppermost closure cap from the at least one closure cap stack, for transferring the grasped closure cap to the sample vessel to be closed, and for introducing the grasped closure cap into an opening of the sample vessel for the sealed closure of the opening, wherein the closure gripper has a centering piece, which is insertable into a closure cap in such a way that it bears on the concave inner side of the closure cap. Advantageous refinements of such a system include that the closure caps are formed from a film by forming. The closure caps each have an outwardly facing collar on an edge terminating an open end of the concave inner side, and the centering piece has a stop surface, on which the collar bears when the centering piece is inserted into the concave inner side of the closure cap. The closure gripper has at least one clamping part movable between a release position and a holding position, in which it presses a grasped closure cap from the outer side against the centering piece and clamps it. The system may include two diametrically opposing clamping parts. The system further includes holding means for the fixing holding of the sample vessel in a working position. The system further includes at least one magazine for holding at least two closure cap stacks, which is displaceable in such a way that alternately one closure cap stack provided in the magazine is movable into a supply position, from which an uppermost closure cap of the closure cap stack moved into the supply position can be moved into a working region of the closure gripper. The system may further include a vertical supply tube having a first and a second end, which is arranged having a first, lower end in the region of the magazine in such a way that a closure cap stack positioned accordingly by displacement of the magazine can be introduced into the supply tube, and which discharges at a second end in the working region of the closure gripper. A lifting means for vertically raising the at least one closure cap stack may be provided in the system. An isolation means for isolating closure caps, in particular an uppermost closure cap, from the remaining closure caps of the closure cap stack may also be provided. The closure caps have a tapering, in particular stepped, diameter proceeding from a first rear end toward a second front end, which is inserted into the opening to be closed during the closing of the sample vessel. A method according to the invention which achieves this object comprises the following steps: i. providing at least one closure cap stack formed from a plurality of identically formed, stackable closure caps, which have a convex outer side and a concave inner side, wherein an upper closure cap bears with its convex outer side on the concave inner side of a closure cap located directly underneath in the closure cap stack; ii. grasping an uppermost closure cap of the closure cap stack using a closure gripper having a centering piece, wherein the centering piece is inserted into the concave inner side of the uppermost closure cap until it bears on the inner side; iii. transferring the grasped closure cap from the closure cap stack to the sample vessel to be closed using the closure gripper; iv. inserting the closure cap into and fixing the closure cap in the opening to be closed of the sample vessel, wherein the closure cap is pressed into the opening using the centering piece; and v. removing the closure gripper from the closure cap placed in the opening of the sample vessel. Advantageous refinements of this method include that the closure cap stack is raised until the uppermost closure cap in the closure cap stack is arranged in a transfer position in a working region of the closure gripper. The method further includes that the uppermost closure cap of the closure cap stack is detached from the closure cap stack and isolated before the grasping using the closure gripper.

The system according to the invention for automatically closing sample vessels, in particular sample vessels having medical laboratory samples, is distinguished by the following components essential to the invention:

It contains a plurality of identically formed, stackable closure caps, which have a convex outer side and a concave inner side. The closure caps are stacked in at least one closure cap stack in such a way that an upper closure cap in the closure cap stack bears with its convex outer side on the concave inner side of a lower closure cap located directly underneath in the closure cap stack.

Furthermore, it contains a closure gripper for grasping an uppermost closure cap from the at least one closure cap stack, for transferring the grasped closure cap to the sample vessel to be closed, and for introducing the grasped closure cap into an opening of the sample vessel for the sealed closure thereof. In this case the closure gripper furthermore has a centering piece, which is insertable into a closure cap in such a way that it bears on the concave inner side of the closure cap.

The formation of the closure cap in a stackable manner having convex outer side and concave inner side and the aggregation of the closure caps to form a closure cap stack results in a particularly space-saving stockpiling of closure caps, which can be grasped with the aid of the closure gripper for closing sample vessels, transferred thereto, and introduced into the respective opening thereof for the sealed closure thereof. A space-saving structural form is thus enabled, and closure caps can be stockpiled in a large number and automatically processed without interrupting the operation.

The closure caps are in particular not the original closure caps, using which the sample vessels having the samples contained therein were closed as they were supplied to the analytic laboratory. Rather, separate closure caps are stocked here, which are stocked for the reclosure of the sample vessels. This measure in particular has the result that the closure caps may be formed in the stackable manner as indicated, so that they are to be stockpiled in a space-saving manner. The stackable design having in particular the concave inner side of the closure cap furthermore enables the interaction with the centering piece of the closure gripper, with the aid of which, when it protrudes therein while bearing on the concave inner side of the closure cap, the closure cap can be pressed into the opening to be closed of the sample vessel for secure closing and sealing. Due to this automated and securely guided procedure during the closing of the sample vessels, the surroundings, in particular the system for automatic closing of the sample vessel, are additionally prevented from coming into contact and being contaminated with the content of the sample vessel, i.e., the actual sample. Damage to the sample vessels during the closing with the closure cap is also prevented.

The closure can be formed from a film material by forming, particular stretching or deep-drawing. The film material can in particular be a plastic. The material thickness of this film, i.e., its thickness, is usually dimensioned in this case so that the closure cap formed therefrom is sufficiently dimensionally stable with the lowest possible wall thickness at the same time. A low wall thickness enables even more compact stacking of the closure caps in the closure cap stack and generally results in a lower material consumption and thus in lower costs of the closure cap, which is used in practice as a mass-produced product. It also results in a certain flexibility of the closure caps thus formed, which is also advantageous for the sealed closure of openings of sample vessels.

According to one advantageous refinement of the system according to the invention, the closure cap can have an outwardly facing collar on an edge terminating an open end of the concave inner side and the centering piece can have a stop surface, on which the collar bears when the centering piece is inserted into the concave inner side of the closure cap. On the one hand, this solution provides a stop delimiting the position of the closure cap on the centering piece, on the other hand, it permits a good force transfer from the centering piece to the closure cap when the latter is pressed using the closure gripper for the sealed closure of the sample vessel into the opening thereof.

According to a further advantageous refinement of the invention, the closure gripper can have at least one clamping part, which is movable between a release position and a holding position, in which it presses a grasped closure cap from the outer side against the centering piece and clamps it. Using such a clamping part, the closure gripper can securely hold and clamp a closure cap guided on the centering piece, to then finally detach it from the closure cap stack and guide it to the sample vessel to be closed and introduce it there into the opening to be closed. The closure gripper particularly advantageously has not only one, but rather two diametrically opposing clamping parts. A symmetrical and secure grasping and holding of a closure cap is thus ensured. The clamping parts can be implemented, for example, in the form of clamping jaws.

The system according to the invention can furthermore advantageously have holding means for fixing holding of the sample vessel in a working position. A working position means the position in the system here in which the closure gripper supplies the closure cap and inserts and presses it into the opening of the sample vessel to close it. The holding means, for example, holding bars, holding grippers, or the like are used in this case for the purpose of securely holding the sample vessel, so that it does not threaten to tilt or fall over, for example, or even only changes the position, during the process of the insertion of the closure cap into the opening to be closed. The holding means can in this case also apply an aligning action at the same time, so that the sample vessel is correctly oriented for a supply of the closure gripper having the closure cap arranged thereon.

In order that the system can operate as long as possible and can automatically close as many sample vessels as possible without the necessity of an external engagement, it can have a magazine, in which at least two closure cap stacks are accommodated.

This magazine is then displaceable in such a manner that alternately one of the closure cap stacks provided in the magazine is movable into a supply position, from which an uppermost closure cap of the closure cap stack moved into the supply position is movable into a working region of the closure gripper. Such a magazine can be designed, for example, as a revolver magazine, i.e., as a cylindrical body rotatable around a central axis of rotation having multiple receptacle shafts arranged distributed around the central axis of rotation for closure cap stacks.

If the system has a magazine holding at least two closure cap stacks, it can thus furthermore advantageously have a vertical supply tube, which has a first and a second end and which is arranged having a first, lower end in the region of the magazine so that a closure cap stack positioned accordingly by displacement of the magazine can be introduced into the supply tube. This supply tube then discharges at a second end into the working region of the closure gripper. The supply tube thus forms a section of a conveyor line here, via which a closure cap stack can be conveyed here in the vertical direction proceeding from the magazine in the direction of the working position of the closure gripper, in which the latter can grasp an uppermost closure cap of the closure cap stack and carry it along. This construction enables a vertical separation between a magazine region, in which the closure caps are stockpiled in stacks, and the working region of the closure gripper. This in turn favors a compact construction of the overall system and/or a device integrated into the system.

Furthermore, the system can advantageously have lifting means for vertically raising the at least one closure cap stack. Such lifting means ensure that even with decreasing stack height, an uppermost closure cap of the closure cap stack is always positioned ready to be removed in corresponding vertical position for the closure gripper. Such lifting means can be implemented, for example, in the form of a spike or a rod or another lifting part engaging from below on the lowermost closure cap in the closure cap stack, which is displaceable upward in the vertical direction and via this presses the closure cap stack upward in a guide. Closure cap stacks can also be transferred from a magazine into the supply tube using such a lifting means.

Furthermore, isolating means can advantageously be provided in the system for isolating closure caps, in particular an uppermost closure cap, from the remaining closure caps of the closure cap stack. Such an isolation of closure caps from the closure cap stack, in particular the uppermost closure cap of the closure cap stack, facilitates grasping individual closure caps using the closure gripper and handling them further for closing of the sample vessel.

In the system according to the invention, the closure caps are particularly advantageously formed proceeding from a first rear end toward a second front end, which front end is inserted into the opening to be closed during the closing of the sample vessel, having a tapering, in particular stepped diameter. If this diameter is tapered in a stepped manner, it can be formed in particular in different cylinder sections arranged like steps. An embodiment as described above makes the closure caps for closing openings of different diameters suitable for the closing thereof. If the opening diameter is small, a region of the closure cap facing toward the front end having smaller diameter engages with the opening, if the diameter is larger, the closure cap will be pressed farther into the opening until a section located closer to the rear end having larger diameter bears on the wall surrounding the opening, and thus seals the opening closed.

As already mentioned, furthermore a method for automatically closing sample vessels, in particular sample vessels having medical laboratory samples, is specified by the invention, which comprises the following steps:

providing at least one closure cap stack formed from a plurality of identically formed, stackable closure caps, which have a convex outer side and a concave inner side, wherein an upper closure cap bears with its convex outer side on the concave inner side of a lower closure cap located directly underneath in the closure cap stack;

grasping an uppermost closure cap of the closure cap stack using a closure gripper having a centering piece, wherein the centering piece is inserted into the concave inner side of the uppermost closure cap, until it bears on the inner side, in particular over its entire circumference;

transferring the grasped closure cap from the closure cap stack to the sample vessel to be closed using the closure gripper;

inserting the closure cap into and fixing the closure cap in the opening to be closed of the sample vessel, wherein the closure cap is pressed into the opening using the centering piece;

releasing the closure gripper from the closure cap placed in the opening of the sample vessel.

This method is executed in particular using the system according to the invention and enables automatic closing of sample vessels using a system and/or a device in a compact arrangement.

In the method, the closure cap stack can advantageously be raised until the uppermost closure cap in the closure cap stack is arranged in a transfer position into a working region of the closure gripper. This transfer position can be exactly defined with respect to the vertical and horizontal location, so that the uppermost closure cap of the closure cap stack always comes to rest in this position when the closure cap stack is raised accordingly. This enables an exact and simple transfer of the uppermost closure cap from the closure cap stack to the closure gripper, which can then transfer it grasped exactly aligned to the sample vessel to be closed and can close the sample vessel using it.

In the method according to the invention, the uppermost closure cap of the closure cap stack is advantageously detached and isolated from the closure cap stack before the grasping using the closure gripper. The already isolated closure cap can thus be grasped using the closure gripper without the closure gripper itself having to apply a corresponding force for isolating the closure cap, which would result in the hazard that the closure cap does not bear in the exact position on the closure cap, but rather slips or tilts and with thus no longer be correctly positioned for exact closing of the sample vessels. vessels of uniform dimensioning can be closed using this device. However, in the everyday activity of an analysis laboratory, generally greatly differing sample vessels are handled, for example, tubular sample vessels in a medical analytic laboratory, which in particular have different removal openings to be reclosed, in particular those having different diameters. The handling of a reclosure of such varied sample vessels is not automatically possible using the previously known system.

BRIEF DESCRIPTION OF THE SEVERAL VIEWS OF THE DRAWINGS

Further features and advantages of the invention result from the following description of an exemplary embodiment of the invention. In the figures.

DETAILED DESCRIPTION

A possible exemplary embodiment of a system according to the invention and also a method according to the invention for automatically closing sample vessels are explained hereafter on the basis of the figures. The system according to the invention is implemented in this case in a closing device, of which those details are illustrated in the figures which are important for the system according to the invention and its operation.

Figure 1:
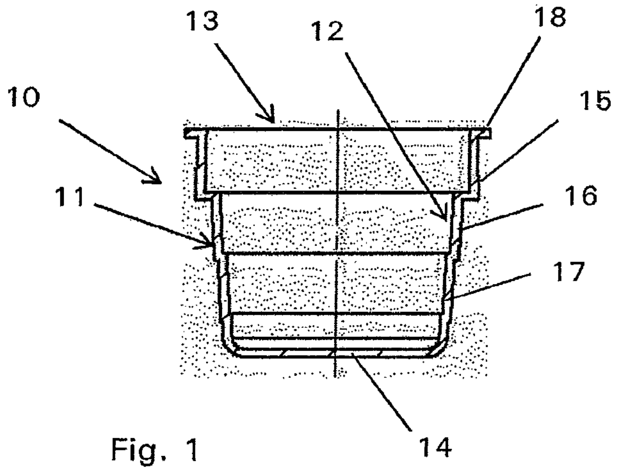
FIG. 1 shows a longitudinal section through a closure cap used in an exemplary embodiment of the system according to the invention.

Firstly, a closure cap 10 is shown in FIG. 1, which is part of the system according to the invention. The closure cap 10 is designed as stackable having a convex outer side 11 and a concave inner side 12. At a rear end 13, the closure cap 10 is formed open, i.e., a further identically formed closure cap 10 can be set here with its convex outer side 11 so that it bears on the concave inner side 12 of the closure cap 10 shown. The closure cap 10 is closed by a base at a front end 14.

The closure cap 10 consists of a thin-walled material. This can be in particular a film material, such as a plastic film especially, wherein the closure cap 10 is then formed in particular by forming from a corresponding flat film section, for example, by deep-drawing. The diameter of the closure cap 10 tapers from the rear end 13 up to the front end 14, wherein this takes place in steps here in three rough first steps 15, 16, and 17, which are each in turn divided into smaller fine steps (no longer identified by reference signs in the figure, but still recognizable). In this case, the step located at the front end 14, which is smallest in diameter, is used for centering the closure cap 10 during the insertion into an opening to be closed of a sample vessel. A peripheral collar 18 extends around the opening formed toward the inner side 12 there at the rear end 13.

Figure 2:
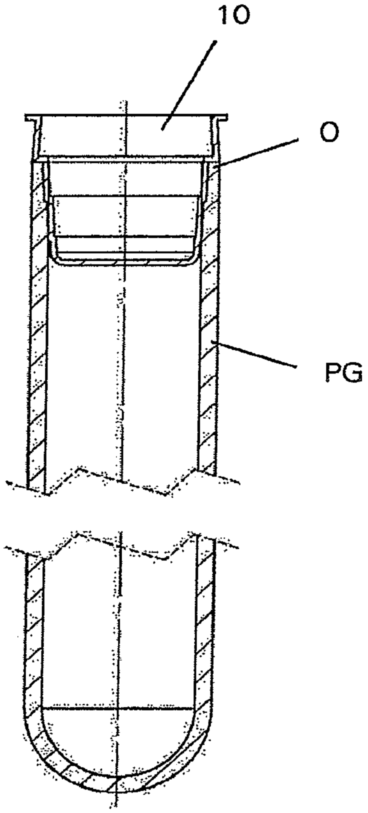
FIG. 2 shows a longitudinal section through a sample vessel, which is tubular here, closed using a closure cap according to FIG. 1.

FIG. 2 shows how a closure cap 10 according to FIG. 1 is seated in an opening O of a sample vessel PG, which is tubular here, and seals closed this opening O. The closure cap 10 is particularly suitable for sealing closed this opening O because it has a measure of flexibility due to its low wall thickness and can be inserted under tension into the opening O so that it deforms somewhat and thus exerts a pressure on the inner wall of the sample vessel PG. The stepped design of the outer side 11 of the closure cap 10 also assists for this purpose. Moreover, the stepped design of the outer side 11 and/or the diameter of the closure cap 10 has the result that sample vessels PG having different opening diameters can be closed using the same closure cap 10. The sample vessel PG shown in FIG. 2 can be in particular a sample tube for medical laboratory samples, for example, for blood samples or the like.

Figure 3:
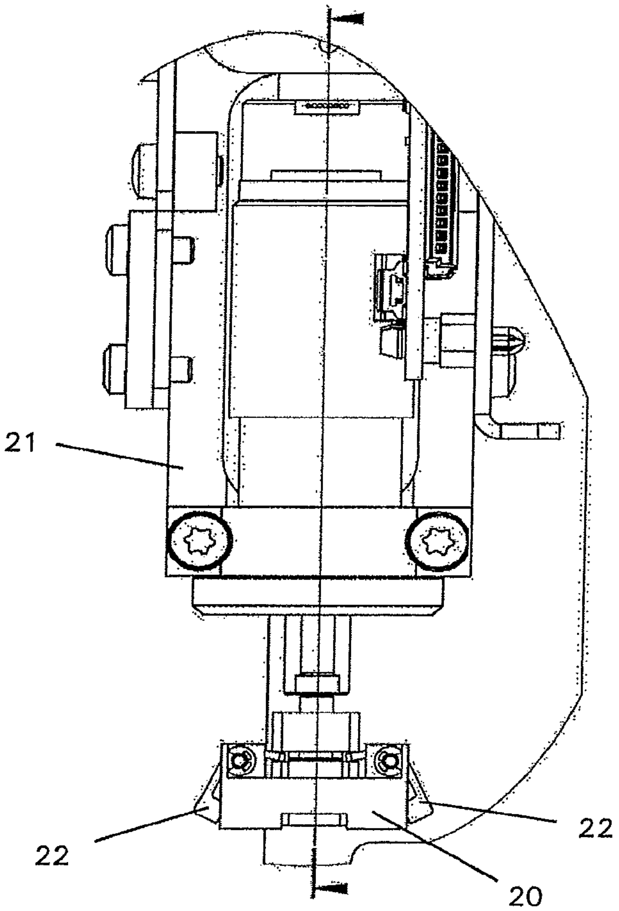
FIG. 3 shows a detail of a closure device having a closure gripper associated with an exemplary embodiment of the system according to the invention for grasping and handling closure caps according to FIG. 1.

A further essential element of the system according to the invention is shown in FIG. 3, namely a closure gripper 20. This is arranged on a gripper arm 21, which is linearly movable in the vertical and also horizontal directions, as will be explained in greater detail hereafter. The closure gripper 20 has, as may already be seen from FIG. 3, two diametrically opposing clamping jaws 22, which are located in a release position in the position shown in FIG. 3.

Figure 4:
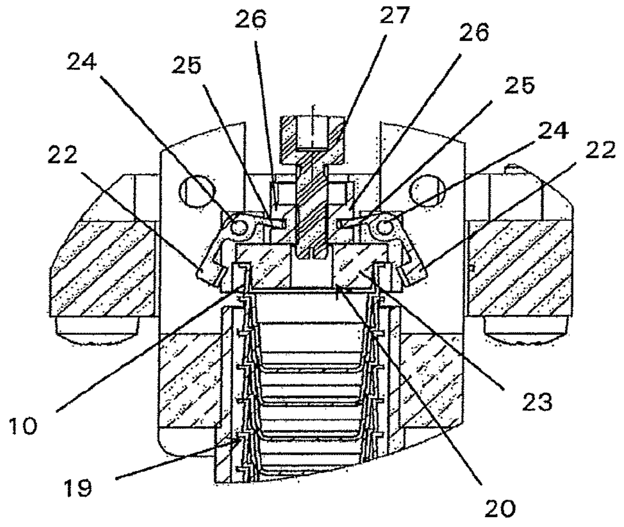
FIG. 4 shows an illustration of a detail of the closing device having the closure gripper according to FIG. 3 in longitudinal section, as it bears on an uppermost closure cap of a closure cap stack formed in the system according to the invention by placing multiple identical closure caps one inside another according to FIG. 1 and engages therein with a centering piece.
Figure 5:
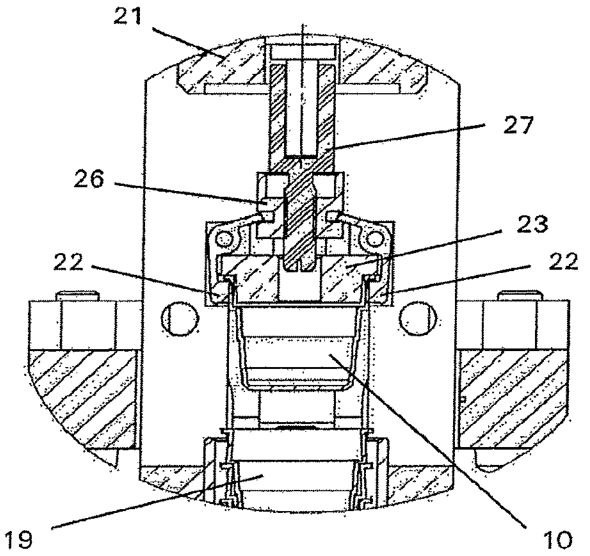
FIG. 5 shows an illustration comparable to FIG. 4 having the closure gripper, as it has grasped the uppermost closure cap of the closure cap stack and lifted it off of the closure cap stack.

The construction of the closure gripper 20 may be seen more accurately in FIG. 4. This element is shown in a longitudinal section therein. It can be seen here that a centering piece 23 is arranged in the center of the closure gripper 20, which is delimited at an end shown on top in the figure with a peripheral edge. It can also be seen here that the clamping jaws 22 are each rotatably mounted on an axis 24 and are fixed with an end 25 located beyond the axis 24 in a slot formed in a traction piece 26. The traction piece 26 is arranged on a traction rod 27 and fixed thereon. In the position shown in FIG. 4, the closure gripper 20 is plunged with the centering piece 23 into an uppermost closure cap 10 of a closure cap stack 19, in which the identically shaped closure caps 10 are stacked one inside another in the manner according to the invention, and bears with a circumference on the inner side of this closure cap 10. In this case, the peripheral collar 18 (not identified with a reference sign in the figure) abuts the peripheral edge at the edge of the centering piece 23 so that a stop is formed here. In this position, the traction piece 26 can be moved away from the centering piece 23 by moving the traction rod 27, whereby the clamping jaws 22 are rotated and are pressed against the centering piece 23, more precisely against the outer side of the closure cap 10 located on the centering piece 23. The closure cap 10 is thus held and clamped. It is already shown here in FIG. 5 how the closure cap 10 can be lifted off of the closure cap stack 19 with the aid of a movement of the gripper arm 21.

An arrangement located in the closing device below a working position of the closure gripper 20 can be seen in FIG. 6. A magazine 30, which is formed like a drum magazine, can firstly be seen here. The magazine 30 contains, arranged distributed along its circumference around a center axis, for example, six or eight shafts 31, in which closure cap stacks 19 can be accommodated. The magazine 30 is seated in this case on a spike 32, which protrudes into a central opening of the magazine. The spike 32 has a protruding driver pin 33, which is guided transversely through it, and which has a formfitting engagement with the magazine, so that the magazine 30 can be rotated by rotating the spike 32. This takes place automatically and driven by a motor in operation of the closing device. The shafts 31 are open toward the outer side of the magazine 30 in a continuous slot. A lifting piece 34 can enter the respective shaft 31 through this slot and grasp a closure cap stack 19 at the base of the closure cap arranged lowermost. Via a toothed rack 35 and one or more gear wheels cooperating therewith and a drive driving them (not shown in greater detail), the lifting piece 34 can be moved in the vertical direction to thus transfer a closure cap stack 19, as shown here in FIG. 6, into a vertically arranged supply tube 40. If a shaft 31 of the magazine 30 is completely emptied in this manner, the spike 32 is thus rotated until a further shaft 31 filled with a further closure cap stack 19 aligns with the supply tube 40, so that a further closure cap stack 19 can be transferred using the lifting piece 34 into the supply tube 40. A lifting piece guide 36 can also be seen in FIG. 6. The magazine 30 is raised using this. When the lifting piece 34 begins, driven by the motorized drive, to move upward from a lowermost position, the lifting piece guide 36, on which the lifting piece 34 bears in the lowermost position and locks it in a first position, is disengaged. The magazine 30 is then lifted by a spring (not shown in greater detail here) on the spike 32 by a travel distance of approximately 10 mm here and locked in a centering unit 37 (see FIG. 7). In this manner, a play in the and/or tolerances between the magazine(s) 30 can be compensated for. If the lifting piece 34, for example, when a shaft 31 of the magazine 30 is completely empty, travels back into its lowermost position, it thus presses against the lifting piece guide 36 and the magazine 30 is pressed back downward against the force of the spring again and released from the locking with the centering unit 37. In this case, a pressure spring plate 38 (see FIG. 7) assists, which also presses the magazine 30 downward into an unlocked position. A new shaft 31 having further closure caps 10 can then be rotated into position, for example, by rotation of the magazine 30 (a rotation of the spike 32 and thus the magazine 30 is only possible if the lifting piece 34 is located in its lowermost position and the centering unit 37 is thus released from the magazine 30 and unlocks it).

Figure 6:
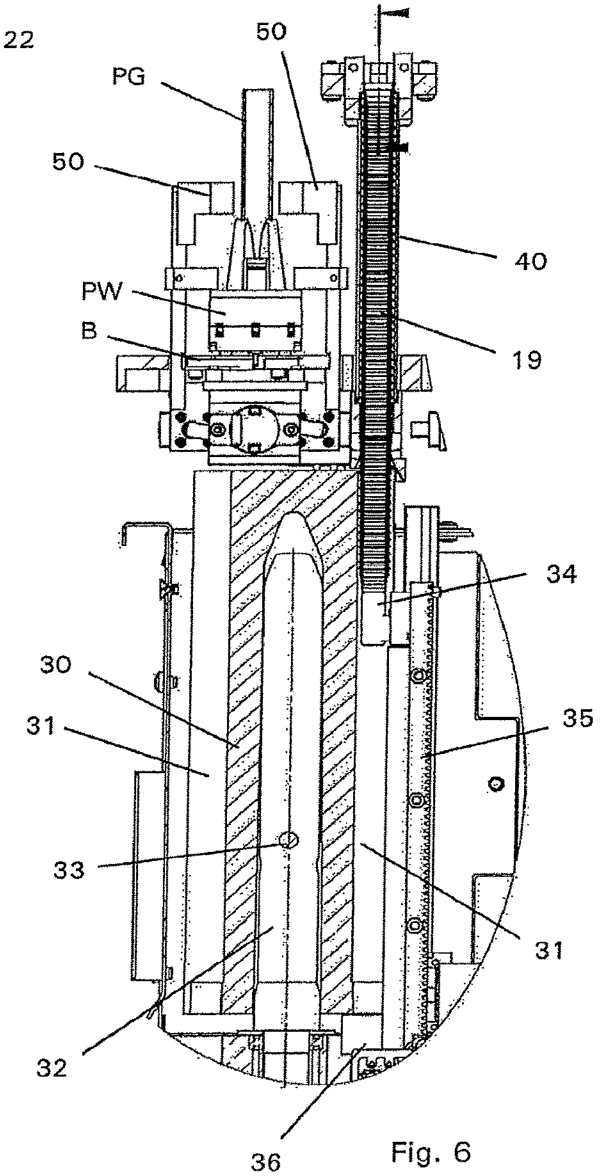
FIG. 6 shows an illustration of another detail of the closing device having the system according to the invention, in which a magazine for closure cap stacks and a lifting means for raising a closure cap stack out of the magazine and into a supply tube is shown.

A sample vessel PG, which has an opening still to be closed on an upper side, supplied to the closing device in a sample carriage PW, which can move independently on a path B, can also be seen in FIG. 6. Furthermore, holding arms 50 can be seen, the function of which will be described in greater detail hereafter.

Figure 7:
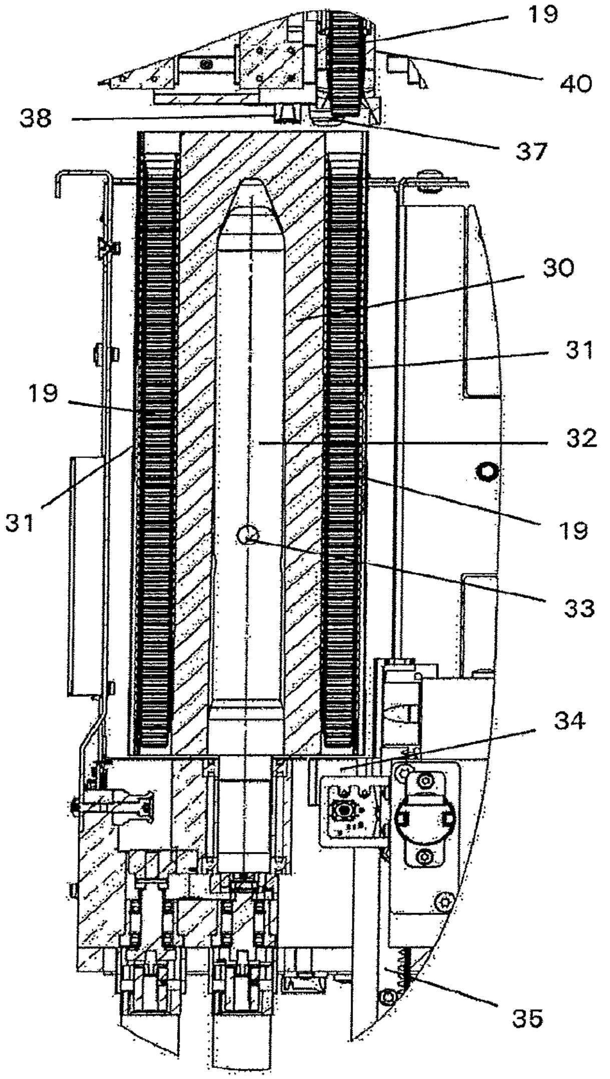
FIG. 7 shows, in a detail similar to the detail shown in FIG. 6, the magazine once again, here equipped with multiple closure cap stacks.

FIG. 7 shows a similar situation as FIG. 6 once again, wherein a magazine 30 filled with closure cap stacks 19 in multiple shafts 31 is shown here, and also a closure cap stack 19, which is arranged in the supply tube 40. The lifting piece 34, which is now located in a lowermost position and bears on the lifting piece guide 36, and the toothed rack 35 can also be seen.

Figure 8:
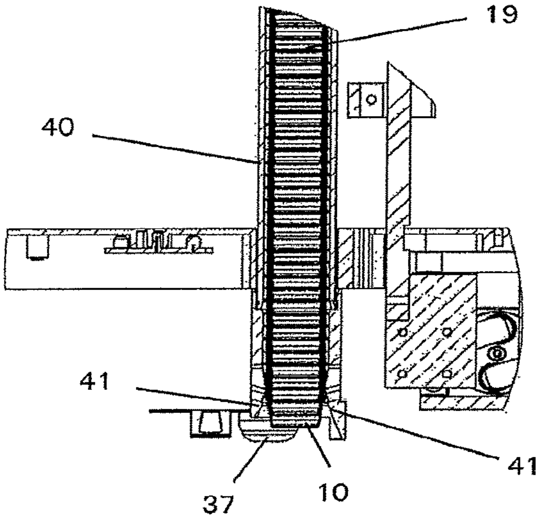
FIG. 8 shows an enlarged detail of the lower end of a closure cap stack accommodated in the supply tube.

FIG. 8 shows an enlarged illustration of a lower portion of the supply tube 40 having a threading opening for the closure cap stack 19. A lowermost closure cap 10 in the closure cap stack 19 can be seen, which is held back in the supply tube 40 by two diagonally arranged spring plates 41 used for a first isolation of the closure caps 10 at the lower end of the supply tube 40, so that a first isolation already takes place here. The arrangement of the spring plates 41 extending diagonally in relation to the longitudinal direction of the supply tube 40 is used for a better supply of the closure caps 10.

Figure 9:
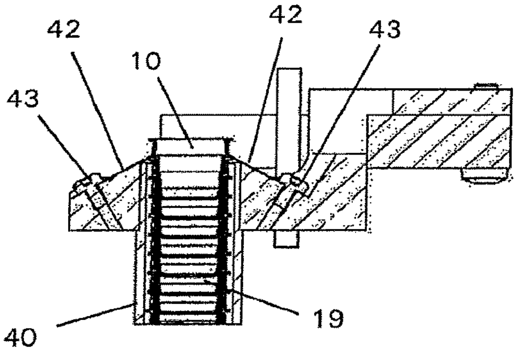
FIG. 9 shows an enlarged detail of the upper end of a closure cap stack accommodated in the supply tube.

An upper portion of the supply tube 40 is also shown enlarged once again, in this case in FIG. 9. It can be seen therein that flexible tabs 42 are fastened on one side using screws 43 and are placed extending diagonally in relation to the vertical and with the ends facing toward one another extending upward. These tabs 42 ensure an isolation of the uppermost closure cap 10 in the closure cap stack 19. This is because the flexible tabs 42 press on the peripheral collar of the second-uppermost closure cap in the closure cap stack 19 and thus hold it back. The uppermost closure cap 10 is already detached to a certain extent from the closure cap stack 19 in this case, so that later it can be grasped more easily by the closure gripper and lifted off of the closure cap stack 19.

Figure 10:
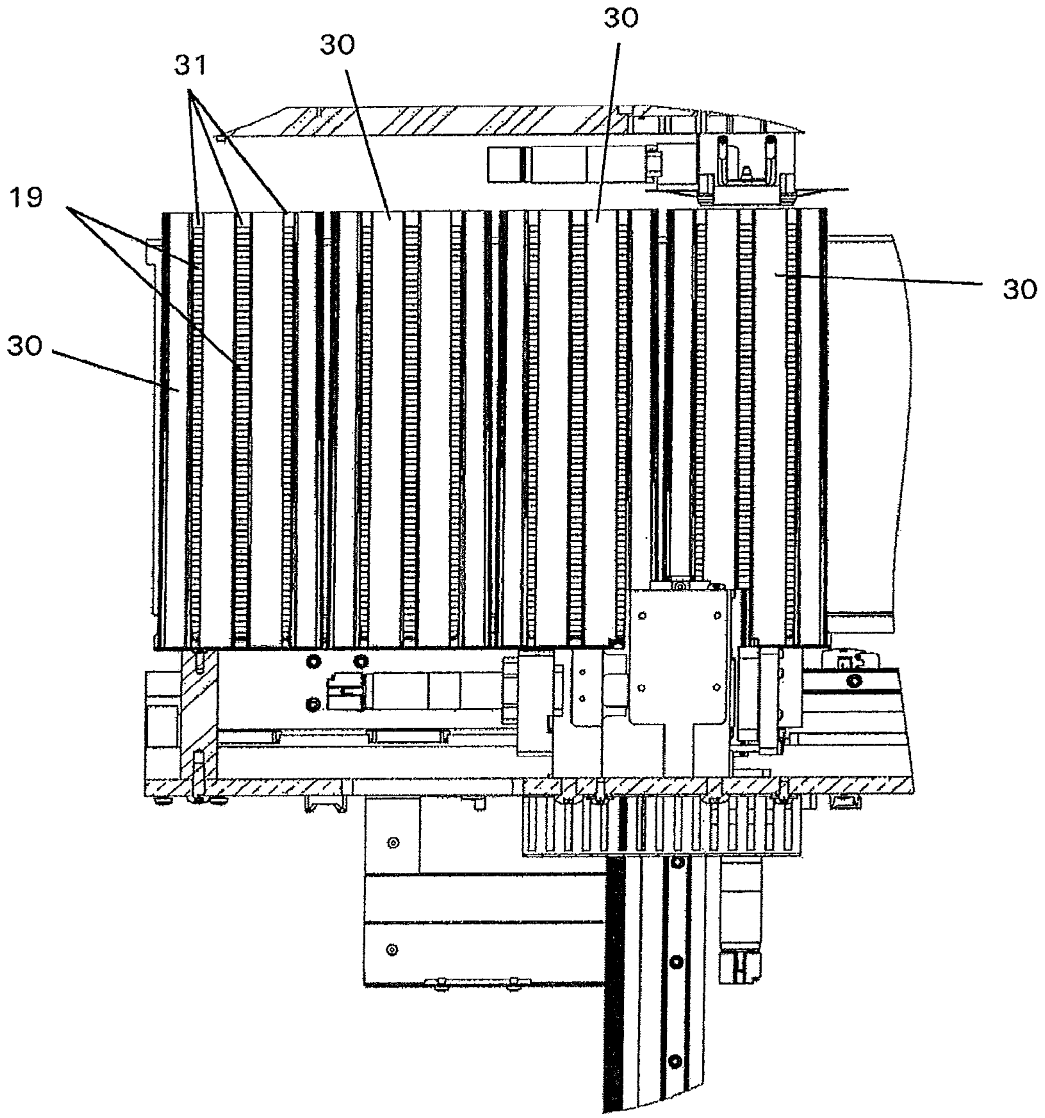
FIG. 10 shows an illustration of a detail of the closing device equipped with the system according to the invention having a plurality of magazines arranged therein, each equipped with multiple closure cap stacks.

A detail of the closing device is shown once again enlarged in FIG. 10, which contains a magazine store, in which multiple magazines 30, four such magazines shown here, are arranged. The magazines stored therein each have multiple shafts 31 having closure cap stacks 19 arranged therein. If a magazine 30 having closure cap stacks 19 is completely emptied, a new magazine 30 can thus be supplied and the closure cap stacks 19 can be transported out of this magazine and the closure caps stacked therein can be processed. The magazine 30 can be formed in particular from a light material, for example, Styropore. A transfer of the magazines 30 from the magazine store into a working position, in which closure cap stacks 19 can be transferred from the magazine 30 into the supply tube 40, can take place manually or also automatically in this case.

Figure 11A:
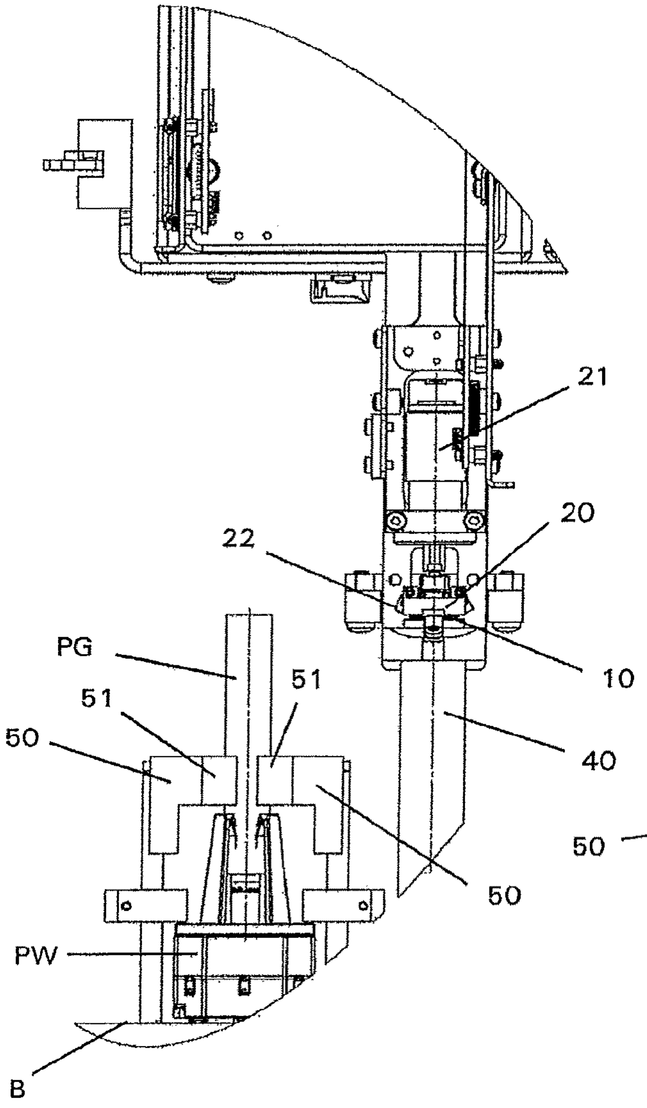
FIGS. 11*a*, 11*b*, 11*c*, 11*d*, and 11*e* show a detail of the closing device having the closure gripper and a sample vessel located in the closing device to illustrate the work sequence according to the invention during the closing of the sample vessel using a closure cap of the system according to the invention.

Finally, FIG. 11*a* to *e* schematically show a sequence for closing a sample vessel PG. At the beginning, as shown in FIG. 11*a*, a sample vessel PG is supplied and moved into a working position. This takes place here by way of a self-propelled sample carriage PW, which independently transports the sample vessels PG in a path B. Holding arms 50, which engage with holding jaws 51 on the sample vessel PG and fix it in its position, are provided for fixing the sample vessel PG. These holding arms 50 are already moved into a holding position in FIG. 11*a*, so that they secure the sample vessels PG.

Figure 11B:
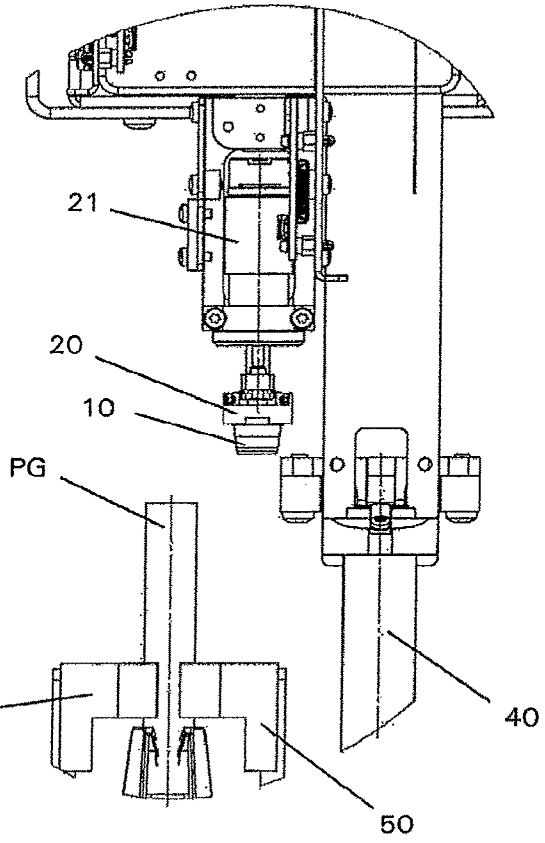

The gripper arm 21 having the closure gripper 20 arranged thereon is lowered into a position in which an uppermost closure cap 10 of a closure cap stack located in the supply tube 40 can be grasped. The closure gripper 20 is introduced from the rear end into the closure cap 10 with the centering piece and engages on the inner side thereof on the wall thereof. The closure cap 10 is thus centered and also correctly positioned by the stops of the peripheral collar on the edge of the centering piece. In the position shown in FIG. 11*a*, the clamping jaws 22 are still open. They are now closed, and the closure cap 10 is lifted off of the closure cap stack by moving the gripper arm 21 upward in the vertical direction. As shown in FIG. 11*b*, a transportation also takes place in the horizontal direction at the same time, to transfer the closure cap 10 grasped using the closure gripper 20 to the sample vessel PG to be closed. The sample vessel PG is still fixed by the holding arms 50.

Figure 11C:
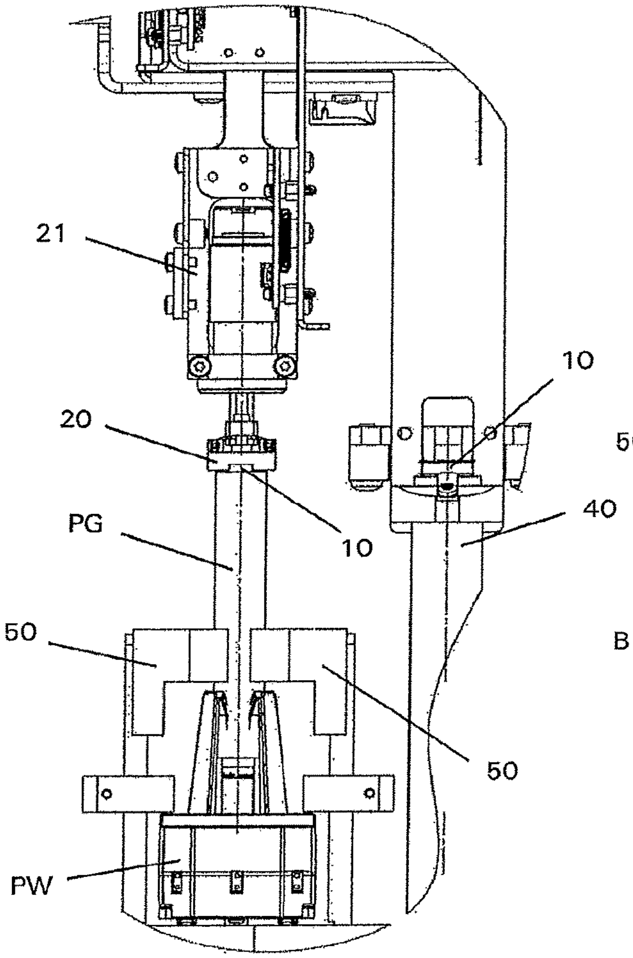
Figure 11D:
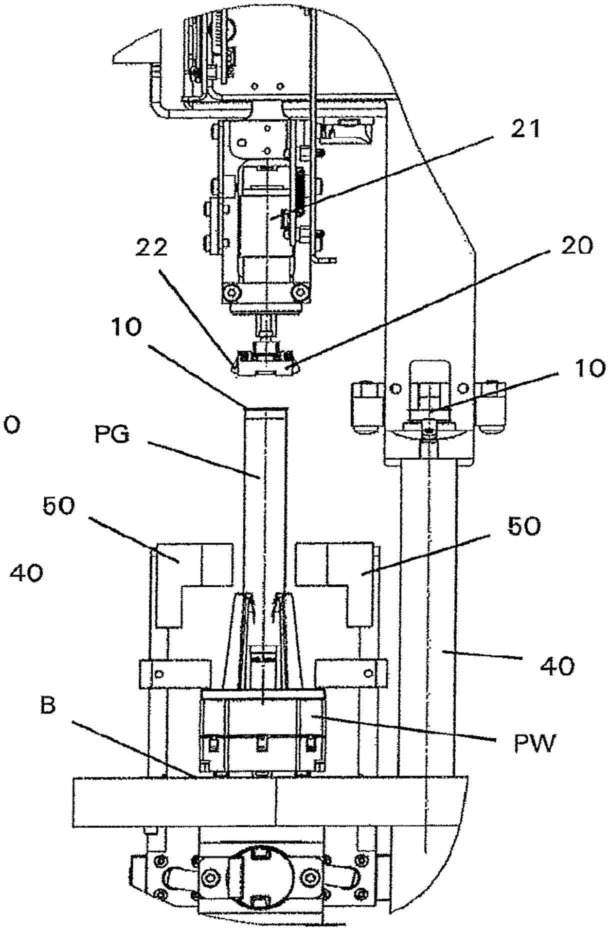

It is now shown in FIG. 11*c* how the closure gripper 20 having the closure cap 10 fixed thereon is pressed against the sample vessel PG by lowering the gripper arm 21 to introduce the closure cap 10 into the opening to be closed. The clamping jaws 22 still also hold the closure cap 10, which is now pressed and inserted in this way into the opening of the sample vessel PG to form a seal. For this purpose, pressure sensors and/or force sensors on the closure gripper 20 and/or on the gripper arm 21 control the movement distance or the drive force, respectively, during the insertion of the closure cap 10 into the opening of the sample vessel PG. If the closure cap 10 is correctly positioned in the opening and seals it closed, the clamping jaws 22 are opened by lowering the traction rod and the closure gripper 20 is released from the closure cap 10 by raising the gripper arm 21, in particular the centering piece is freed from the opening at the rear end of the closure cap 10. The sample vessel PG is now sealed closed and can be further processed. The holding arms 50 are now pivoted back accordingly, so that the holding jaws 51 release the sample vessel PG, which can now be transported further using the sample carriage PW, in particular to a sample archive.

Figure 11E:
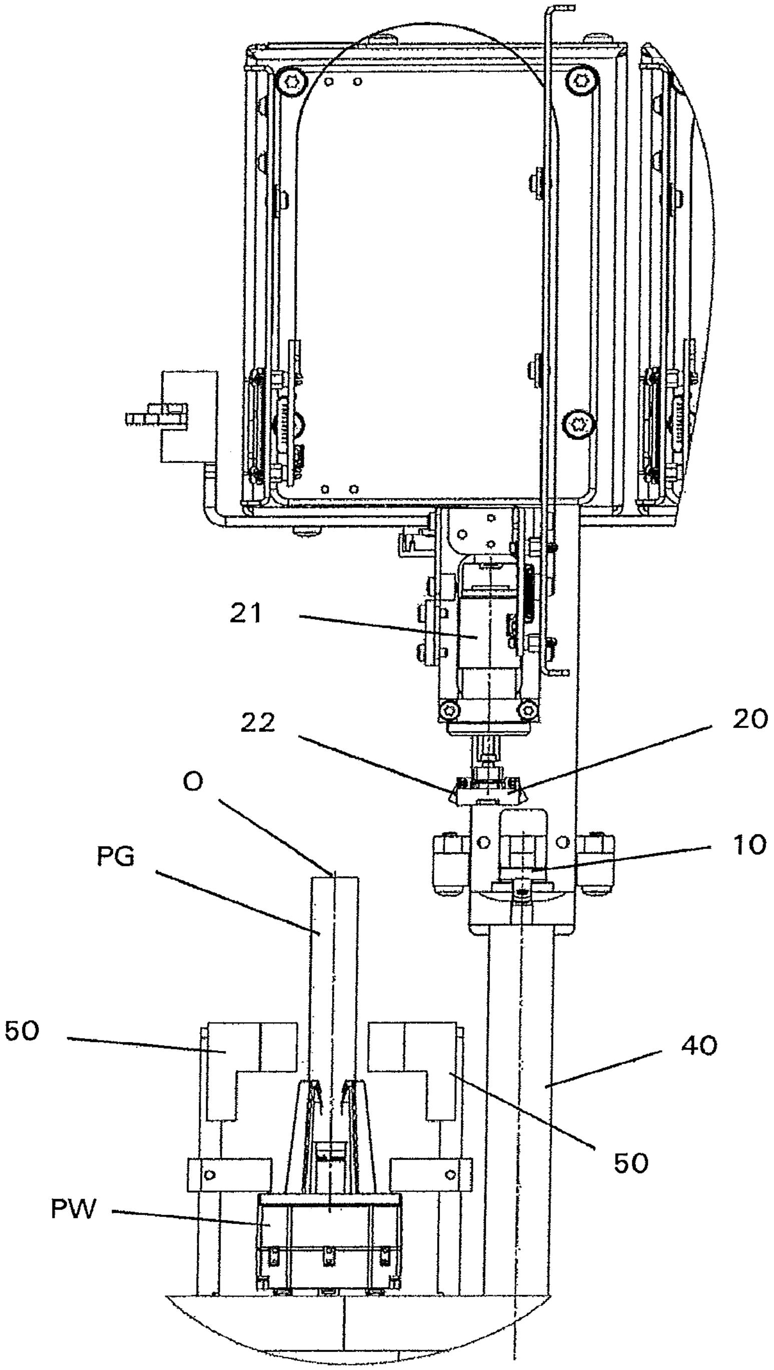

While a new sample vessel PG having opening O still to be closed can already be moved using a further sample carriage PW into the working position, as shown in FIG. 11*e*, the gripper arm 21 having the closure gripper 20 travels back to the vertical upper end of the supply tube 40, to accept a further closure cap 10 there, which now forms the uppermost closure cap of the closure cap stack arranged in the supply tube 40, wherein the procedure for closing this further sample vessel PG begins again, as shown in FIG. 11*a*.

It is clear once again from the above description what a great advantage the system according to the invention and also the method according to the invention involve for the automatic closing of sample vessels. In addition to automatic handling and the option of securely closing sample vessels PG of different constructions, in particular having different opening diameters, the large quantity of uniform, stackable closure caps 10 is to be mentioned here, which can be stockpiled and processed in the system. A large number of sample vessels PG can thus be closed automatically, before a manual engagement is necessary, for example, for re-equipping with closure caps.

In this case, the preceding exemplary embodiment is not to be understood as restricting the system according to the invention to this embodiment, but rather is merely used for explanation. A system according to the invention in its general form is defined in the following claims, as is a method according to the invention.

LIST OF REFERENCE SIGNS

10 closure cap
11 outer side
12 inner side
13 rear end
14 front end
15 step
16 step
17 step
18 collar
19 closure cap stack
20 closure gripper
21 gripper arm
22 clamping jaw
23 centering piece
24 axis
25 end
26 traction part
27 traction rod
30 magazine
31 shaft
32 spike
33 driver pin
34 lifting piece
35 toothed rack
36 lifting piece guide
37 centering unit
38 pressure spring plate
40 supply tube
41 spring plate
42 flexible tab
43 screw
50 holding arm
51 holding jaw
B path O opening PG sample vessel PW sample carriage

What is claimed is:

1. A medical laboratory automation system comprising:

a path;

a carriage moveable along the path, the carriage to hold a sample tube containing a human sample;

a recapper, the carriage to transport the sample tube along the path between an automated measuring device and a working position in the recapper, the recapper including:

a supply tube to hold a stack of caps; and a gripper to obtain an uppermost cap from the stack of caps and insert the uppermost cap into a top of the sample tube; and a decapper to remove the uppermost cap or another cap from the sample tube prior to the sample tube being transported to the automated measuring device.

2. The medical laboratory automation system of claim 1, further including a sample archive area to store the sample tube.

3. The medical laboratory automation system of claim 2, wherein sample archive area is cooled.

4. The medical laboratory automation system of claim 1, wherein the gripper is to insert the uppermost cap into the sample tube while the sample tube remains on the carriage.

5. The medical laboratory automation system of claim 1, wherein the carriage holds one sample tube.

6. The medical laboratory automation system of claim 1, wherein the carriage is a self-propelled carriage.

7. The medical laboratory automation system of claim 1, wherein the carriage includes a base and a set of arms extending upward from the base, the sample tube to be disposed between the arms.

8. The medical laboratory automation system of claim 1, wherein the recapper includes holding arms to engage and hold the sample tube before the gripper inserts the uppermost cap into the sample tube.

9. The medical laboratory automation system of claim 8, wherein the holding arms are diametrically opposed.

10. The medical laboratory automation system of claim 9, wherein the holding arms include holding jaws.

11. The medical laboratory automation system of claim 1, wherein the recapper includes at least one of a pressure sensor or a force sensor on the gripper.

12. A medical laboratory automation system comprising:

a path;

a carriage moveable along the path, the carriage to hold a sample tube containing a human sample; and a recapper, the carriage to transport the sample tube along the path between an automated measuring device and a working position in the recapper, the recapper including:

a magazine with a plurality of slots to hold stacks of caps;

a supply tube;

a lifting arm to move a first stack of caps from the magazine into the supply tube; and a gripper to obtain an uppermost cap from the first stack of caps and insert the uppermost cap into a top of the sample tube, wherein the magazine is located below the gripper.

13. The medical laboratory automation system of claim 12, wherein the recapper includes a plurality of magazines.

14. A medical laboratory automation system comprising:

a path;

a carriage moveable along the path, the carriage to hold a sample tube containing a human sample; and a recapper, the carriage to transport the sample tube along the path between an automated measuring device and a working position in the recapper, the recapper including:

a magazine with a plurality of slots to hold stacks of caps;

a motor to rotate the magazine; and a gripper to obtain an uppermost cap from a first stack of caps and insert the uppermost cap into a top of the sample tube.

15. A medical laboratory automation system comprising:

a path;

a carriage moveable along the path, the carriage to hold a sample tube containing a human sample; and a recapper, the carriage to transport the sample tube along the path between an automated measuring device and a working position in the recapper, the recapper including:

means for storing a plurality of stacks of caps;

means for holding one of the stack of caps;

means for automatically moving the stack of caps from the storing means to the holding means; and means for automatically transferring an uppermost cap from the stack of caps to the sample tube and inserting the uppermost cap into a top of the sample tube.

16. The medical laboratory automation system of claim 15, further including means for isolating the uppermost cap of the stack of caps from a second cap that is below the uppermost cap.

* * * * *